US008653019B2

(12) United States Patent
Yamaguchi et al.

(10) Patent No.: US 8,653,019 B2
(45) Date of Patent: Feb. 18, 2014

(54) STAIN REMOVER CONTAINING FLUOROPOLYMER

(75) Inventors: Fumihiko Yamaguchi, Settsu (JP); Masashi Nanri, Settsu (JP); Kazunori Hayashi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 92 days.

(21) Appl. No.: 12/500,942

(22) Filed: Jul. 10, 2009

(65) Prior Publication Data

US 2009/0270307 A1 Oct. 29, 2009

Related U.S. Application Data

(62) Division of application No. 11/547,127, filed as application No. PCT/JP2005/005367 on Mar. 24, 2005, now abandoned.

(30) Foreign Application Priority Data

Apr. 5, 2004 (JP) ................. 2004-111062

(51) Int. Cl.
*C11D 9/28* (2006.01)
*C11D 3/37* (2006.01)
*C08F 214/18* (2006.01)

(52) U.S. Cl.
USPC ............ 510/528; 8/137; 510/276; 510/281; 526/243; 526/245

(58) Field of Classification Search
USPC .......... 510/108, 276, 281, 528; 524/544–606; 526/243, 245; 8/137
See application file for complete search history.

(56) References Cited

U.S. PATENT DOCUMENTS

| | | | | |
|---|---|---|---|---|
| 3,574,791 | A | * | 4/1971 | Sherman et al. .............. 525/276 |
| 3,993,833 | A | * | 11/1976 | Esmay ....................... 428/317.3 |
| 5,057,577 | A | * | 10/1991 | Matsuo et al. ............... 525/276 |
| 5,057,585 | A | * | 10/1991 | Agou et al. .................. 526/246 |
| 5,081,165 | A | * | 1/1992 | Inukai et al. ................. 522/182 |
| 5,558,940 | A | | 9/1996 | Michaels et al. |
| 5,629,376 | A | * | 5/1997 | Sargent et al. ............... 524/745 |
| 5,714,082 | A | * | 2/1998 | Boardman et al. ........... 252/8.62 |
| 6,274,060 | B1 | | 8/2001 | Sakashita et al. |
| 6,355,753 | B1 | * | 3/2002 | Yamana et al. ............ 526/292.3 |
| 6,482,911 | B1 | * | 11/2002 | Jariwala et al. .............. 526/245 |
| 6,740,470 | B2 | | 5/2004 | Tan et al. |
| 2002/0143099 | A1 | * | 10/2002 | Wada et al. .................. 524/520 |
| 2003/0139550 | A1 | | 7/2003 | Savu et al. |
| 2003/0215743 | A1 | * | 11/2003 | Goto ............................ 430/271.1 |
| 2003/0236340 | A1 | | 12/2003 | Kubicek et al. |
| 2004/0171775 | A1 | * | 9/2004 | Yamamoto et al. .......... 526/247 |
| 2005/0043478 | A1 | * | 2/2005 | Huang et al. ................. 524/805 |
| 2006/0105655 | A1 | * | 5/2006 | Dean ............................ 442/120 |

FOREIGN PATENT DOCUMENTS

| | | | |
|---|---|---|---|
| DE | 44 26 537 | A1 | 2/1996 |
| EP | 0 195 323 | A2 | 9/1986 |
| EP | 0 195 714 | A1 | 9/1986 |
| EP | 0 984 024 | A1 | 3/2000 |
| JP | 53-134786 | A | 11/1978 |
| JP | 59-204980 | A | 11/1984 |
| JP | 62-7782 | A | 1/1987 |
| JP | 63030818 | A * | 2/1988 ............ G02C 7/04 |
| JP | 63-075082 | | 4/1988 |
| JP | 01-275644 | A | 11/1989 |
| JP | 4-68006 | A | 3/1992 |
| JP | 11-49825 | A | 2/1999 |
| JP | 2000-290640 | | 10/2000 |
| JP | 2001-106711 | A | 4/2001 |
| JP | 2002-311577 | | 10/2002 |
| WO | 01/30873 | A1 | 5/2001 |

OTHER PUBLICATIONS

Patsy O. Sherman, et al.; "Textile Characteristics Affecting the Release of Soil During Laundering: Part II: Fluorochemical Soil-Release Textile Finishes"; Textile Research Journal; May 1969; pp. 449-459.
"Preliminary Risk Assessment of the Developmental Toxicity Associated with Exposure to Perfluorooctanoic Acid and its Salts"; U.S. Environmental Protection Agency Office of Pollution.Prevention and Toxics Risk Assessment Division; Apr. 10, 2003.
"EPA Intensifies Scientific Investigation of a Chemical Processing Aid"; EPA Environmental News; United States Environmental Protection Agency; Monday, Apr. 14, 2003.
EPA OPPT Fact Sheet; United States Environmental Protection Agency; Apr. 14, 2003.
"Perfluorooctanoic Acid (PFOA), Fluorinated Telomers; Request for Comment, Solicitation of Interested Parties for Enforceable Consent Agreement Development, and Notice of Public Meeting"; United States Environmental Protection Agency; Federal Register; vol. 68, No. 73; Wednesday, Apr. 16, 2003; pp. 18626-18633.

* cited by examiner

*Primary Examiner* — Tri V Nguyen
(74) *Attorney, Agent, or Firm* — Sughrue Mion, PLLC

(57) ABSTRACT

A stain remover which comprises a copolymer made from as essential ingredients (a) a polymerizable monomer having a polyfluoroalkyl group with less than 8 carbon atoms and represented by the general formula $H_2C{=}CXCOO{-}Y{-}Rf$ and (b) a fluorine-free polymerizable monomer represented by the following general formula: $H_2C{=}CXCOO{-}(RO)_n{-}X$. The stain remover is effective in minimizing the amount of an organic solvent to be used. It imparts to a substrate the excellent property of removing stains therefrom and a satisfactory texture.

9 Claims, No Drawings

STAIN REMOVER CONTAINING FLUOROPOLYMER

CROSS REFERENCE TO RELATED APPLICATIONS

This is a divisional of application Ser. No. 11/547,127 filed Oct. 4, 2006, which is a 371 of PCT Application No. PCT/JP2005/005367 filed Mar. 24, 2005 and which claims benefit of JPA No. 2004-111062 filed Apr. 5, 2004. The above-noted applications are incorporated herein by reference in their entirety.

TECHNICAL FIELD

The present invention relates to a soil release agent used for a textile and the like. Particularly, the present invention relates to a soil release agent which comprises a necessary minimum amount of an organic solvent and which has excellent soil releasability and good handling.

BACKGROUND ART

As a soil release agent (also referred to as "SR agent") which makes easier to remove a soil adhered to an treated article, known are copolymers of a polymerizable monomer containing a polyfluoroalkyl group (hereinafter abbreviated as "Rf group") and a hydrophilic group-containing polymerizable monomer (cf. JP-A-59-204980 and JP-A-62-7782).

In order to obtain these polymers, a large amount of an organic solvent is necessary for the polymerization for the purpose of compatibilizing the Rf group-containing polymerizable monomer with the hydrophilic group-containing polymerizable monomer to give a homogeneous polymer.

In addition, usually, the carbon number of the Rf group in the Rf group-containing polymerizable monomer is substantially at least 8 (JP-A-53-134786 and JP-A-2000-290640).

The reason therefor is that the crystallinity of the Rf group is too low so that the oil repellency is vanished in air and the oily soil unremovably penetrates into the treated article, although the crystallinity of the Rf group is decreased by reducing the number of the Rf group and polymer mobility is increased for the purpose of obtaining sufficient a flip-flop property and exhibiting the soil releasability. The flip-flop property is the property that a surface molecular structure is changed depending on environments in air and in water, which is proposed by Sherman et al. [P. Sherman, S. Smith, B. Johannessen, Textile Research Journal, 39, 499 (1969)].

When, however, the number of the Rf group is at least 8, there is a trend that a large amount of the organic solvent is necessary in the course of obtaining the homogeneous copolymer and the handling of the treated article is decreased.

Further, recently, with respect to a compound containing the Rf group having 8 carbon atoms obtained by telomerization, Federal Register (FR Vol. 68, No. 73/Apr. 16, 2003 [FRL-2303-8]) (http://www.epa.gov/opptintr/pfoa/pfoafr.pdf);
EPA Environmental News FOR RELEASE: MONDAY Apr. 14, 2003 EPA INTENSIFIES SCIENTIFIC INVESTIGATION OF A CHEMICAL PROCESSING AID (http://www.epa.gov/opptintr/pfoa/pfoaprs.pdf); and
EPA OPPT FACT SHEET Apr. 14, 2003 (http://www.epa.gov/opptintr/pfoa/pfoafacts.pdf)
have announced that a "telomer" may possibly metabolize or decompose to perfluorooctanoic acid (hereinafter referred to as "PFOA").

EPA (Environmental Protection Agency of USA) has announced that the EPA intensifies the scientific investigation on PFOA (cf. EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)).

DISCLOSURE OF THE INVENTION

Problems to be Solved by the Invention

An object of the present invention is to provide a soil release agent which comprises a copolymer containing a polyfluoroalkyl group having less than 8 carbon atoms, which comprises an organic solvent in a necessary minimum amount, and which has excellent soil releasability and good handling.

Means for Solving the Problems

The present invention provides a copolymer comprising:
(a) a fluorine-containing acrylate having a linear or branched polyfluoroalkyl group having less than 8 carbon atoms wherein a hydrogen atom at alpha-position may be substituted, and
(b) a fluorine-free (meth)acrylate having an oxyalkylene group.

The copolymer of the present invention acts as an active component of a soil release agent.

Effects of the Invention

Since the soil release agent of the present invention has the increased compatibility with the fluorine-free monomer because of use of the Rf group having the shorter chain, the use amount of the organic solvent used as a polymerization solvent can be limited to the necessary minimum amount. Specifically, while the conventional solution polymerization needs the organic solvent in the amount of at least 2 to 10 times as large as the total of the polymerizable monomer, the polymerization according to the present invention needs the organic solvent in the amount of only at most 1.5 times.

In addition, water together with the organic solvent can be used as the polymerization solvent.

The present invention exhibits the soil releasability at least equal to that of the conventional soil release agent and has good handling or feeling.

In the prior arts, when the number of the carbon atoms in the Rf group is less than 8, the soil releasability is decreased. According to the present invention, however, the use of the polymerizable monomer having the Rf group having less than 8 carbon atoms has both high flip-flop property and the retention of oil repellency in air to give excellent soil releasability.

More excellent soil releasability can be obtained by combining two segments, that is, "ethylene oxide" and "propylene oxide" as alkylene oxide segments of the fluorine-free polymerizable monomer.

BEST MODE OF CARRYING OUT THE INVENTION

The component (a) is preferably of the general formula (1):

wherein X is a hydrogen atom, a methyl group, a fluorine atom, a chlorine atom, a bromine atom, a iodine atom, a $CFX^1X^2$ group (wherein $X^1$ and $X^2$ is a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;

Y is an aliphatic group having 1 to 10 carbon atoms, an aromatic or cycloaliphatic group having 6 to 10 carbon atoms, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group); and Rf is a linear or branched polyfluoroalkyl group having less than 8 carbon atoms.

X may be a fluorine atom, a chlorine atom, a bromine atom, a iodine atom, a $CFX^1X^2$ group (wherein $X^1$ and $X^2$ is a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group.

In the component (a), the Rf group is preferably a perfluoroalkyl group. The carbon number of the Rf group may be from 1 to 6, particularly from 1 to 4, for example, 4. Examples of the Rf group are —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$ and —$(CF_2)_3CF(CF_3)_2$.

Examples of the component (a) are the followings, to which the present invention is not limited.

[Chemical Formula 1]

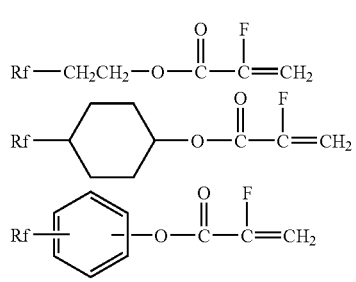

[Chemical Formula 2]

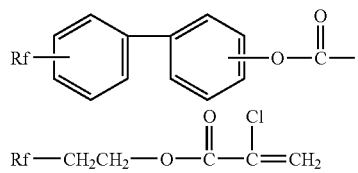

[Chemical Formula 3]

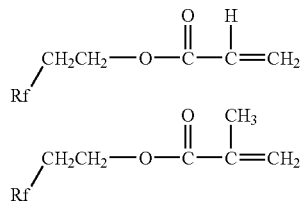

[Chemical Formula 4]

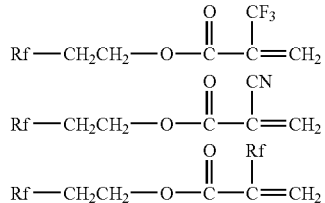

[Chemical Formula 5]

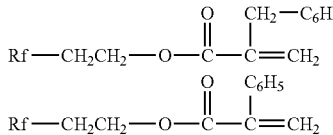

wherein Rf is a linear or branched fluoroalkyl group having 1 to 6 carbon atoms.

The component (a) may be a mixture of at least two.

In the component (b), the oxyalkylene group is preferably an oxyethylene group, an oxypropylene group or a combination of these two.

The component (b) is preferably a compound having at least one (particularly, one) carbon-carbon double bond. The component (b) may be a (meth)acrylate (that is, an acrylate or methacrylate) having oxyalkylene group. The number of oxyalkylene groups may be from 1 to 30.

The component (b) is preferably of the general formula (2):

$$H_2C=CXCOO-(RO)_n-X$$

wherein X is a hydrogen atom or a methyl group,
R is an alkylene group having 2 to 6 carbon atoms, and
n is an integer of 1 to 50.

n may be particularly from 1 to 30, for example, from 2 to 20.

The component (b) is preferably the following combination of two components.

Component (b-1): a compound wherein R in the general formula (2) is ethylene

Component (b-2): a compound wherein R in the general formula (2) is propylene

The weight ratio of the component (b-1) to the component (b-2) may be from 95:5 to 5:95, for example, from 80:20 to 20:80.

Specific examples of the component (b) are, for example, the followings, to which the components (b) is not limited.

$H_2C=CHCOO-CH_2CH_2O-H$ $H_2C=C(CH_3)COO-CH_2CH_2O-H$ $H_2C=CHCOO-(CH_2CH_2O)_9-H$ $H_2C=C(CH_3)COO-(CH_2CH_2O)_9-H$ $H_2C=C(CH_3)COO-(CH_2CH_2O)_9-CH_3$ $H_2C=C(CH_3)COO-(CH_2CH_2O)_5-CH_3$ $H_2C=C(CH_3)COO-(CH_2CH(CH_3)O)_9-H$ $H_2C=CHCOO-(CH_2CH(CH_3)O)_9-H$ $H_2C=C(CH_3)COO-(CH_2CH(CH_3)O)_9-CH_3$ $H_2C=C(CH_3)COO-(CH_2CH(CH_3)O)_{12}-CH_3$ $H_2C=C(CH_3)COO-(CH_2CH(CH_3)O)_{40}-CH_3$ $H_2C=C(CH_3)COO-(CH_2CH_2O)_5-(CH_2CH(CH_3)O)_3-CH_3$

The component (b) may be a mixture of at least two.

In the copolymer of the present invention, the amount of the component (a) may be from 20 to 90% by weight, preferably from 30 to 80% by weight, for example, from 35 to 75% by weight, based on the copolymer. The amount of 20% by weight to 90% by weight can give high soil releasability and can prevent the penetration of oily soil.

The amount of the component (b) may be from 10 to 80% by weight, preferably from 20 to 70% by weight, for example, from 25 to 65% by weight, based on the copolymer. The amount of 10 to 80% by weight can give high soil releasability and can prevent the penetration of oily soil.

The copolymer of the present invention may contain another polymerizable monomer [component (c)], particularly a fluorine-free monomer for the purpose of improving the durability of soil releasability.

Examples of the component (c) include, for example, diacetoneacrylamide, (meth)acrylamide, N-methylol-acrylamide, hydroxymethyl(meth)acrylate, 3-chloro-2-hydroxypropyl(meth)acrylate, N,N-dimethylaminoethyl (meth) acrylate, N,N-diethylaminoethyl(meth)acrylate, butadiene, chloroprene, glycidyl(meth)acrylate, maleic acid derivative, vinyl chloride, glycerol (meth)acrylate, styrene, acetoacetoxyethyl(meth)acrylate and alkyl (meth)acrylate, to which the component (c) is not limited.

The amount of the component (c) may be preferably from 0 to 40% by weight, more preferably from 0 to 30% by weight, for example, from 0.1 to 20% by weight, based on the copolymer. The component (c) may be a mixture of at least two.

The number-average molecular weight of the copolymer of the present invention may be from 1,000 to 1,000,000, preferably from 5,000 to 900,000. The molecular weight of 1,000 to 1,000,000 can give high soil releasability and high viscosity of polymerization liquid giving the easy handling. The molecular weight is measured by a gel permeation chromatography in terms of polystyrene.

The copolymer of the present invention may be a random copolymer, a block copolymer or a graft copolymer.

A polymerization method of producing the copolymer of the present invention is not limited. Various polymerization methods such as a bulk polymerization, a solution polymerization, an emulsion polymerization and a radiation polymerization can be selected. For example, a solution polymerization using an organic solvent and an emulsion polymerization using both an organic solvent and water are generally selected. A treatment liquid is produced by diluting a reaction mixture with water after the polymerization.

Examples of the organic solvent include ketones such as acetone and methyl ethyl ketone; esters such as ethyl acetate and methyl acetate; glycols such as propylene glycol, dipropylene glycol monomethyl ether, dipropylene glycol and tripropylene glycol; and alcohols such as ethyl alcohol and isopropanol.

The amount of the organic solvent is from 0 to 2 parts by weight, preferably from 0 to 1.5 parts by weight, based on 1 part of the copolymer. The polymerization is possible under the amount of at least 2 parts. A lower limit of the amount of organic solvent may be 0.1 parts by weight.

As the emulsifying agent for the emulsion polymerization, various emulsifying agents such as an anionic emulsifying agent, a cationic emulsifying agent and a nonionic emulsifying agent can be used.

A polymerization initiator such as a peroxide compound, an azo compound and a persulfate compound can be used. For the polymerization, the conventionally known mercapto group-containing compounds may be used for the purpose of molecular weight control. Examples thereof include 2-mercaptoethanol and alkyl mercaptan.

The thus produced copolymer is optionally diluted with water and can be applied as a soil release agent to a substrate by an arbitrary method. Examples of application method include an immersion coating and a spray coating. In the present invention, the "treatment" means that a fluorine-containing copolymer, which is an active compound of the soil release agent, is adhered to the treated article (that is, the substrate). The treatment gives the result that the treated article exhibits the soil releasability and water- and oil-repellency.

If necessary, another blender may used. Examples of the blender include water- and oil-repellent agents, crease-proofing agents, shrink-proof agents, antimicrobial agents, pigments and paints.

The substrate, to which the soil release agent of the present invention has been applied, may be subjected to the curing, if necessary.

The soil release agent of the present invention comprises the copolymer and a liquid medium (an organic solvent and/or water). In the soil release agent, the concentration of the copolymer may be from 0.1% to 90.0% by weight, for example, from 1% to 70% by weight. The soil release agent may be in the form of a solution, an emulsion or the like.

The treated article include a textile, masonry, a filter (for example, an electrostatic filter), a dust protective mask, glass, paper, wood, leather, fur, asbestos, brick, cement, metal and oxide, ceramics, plastics, a coated surface and a plaster, to which the treated article is not limited.

EXAMPLES

The following Examples, Comparative Examples and Test Examples are specifically illustrated but are not to be construed to limit the scope of the invention.

In the followings, parts and % are parts by weight or % by weight, unless otherwise specified.

The test for determining the soil releasability (SR property) is conducted by using a textile as follows. A test cloth in 7 cm×7 cm square is spread on a piece of blotting paper horizontally spread and then one drop of a soil which is a dispersion of carbon black (0.1% by weight) in triolein is dropped on the test cloth. A polyethylene sheet is positioned on the test cloth and a weight of 500 g in weight is positioned on the polyethylene sheet. After 60 seconds, the weight and the polyethylene sheet are removed. The test cloth is kept standing at a room temperature for 24 hours to adhere a soil to the test cloth. The test cloth and a ballast cloth together having a total weight of 500 g, and a cleaning agent (12.5 g) (trade name: SUPER COMPACT TOP manufactured by Lion Corporation) are charged into an electrical washer. The test cloth is washed at a bath amount of 25 L and a bath temperature of 40° C. for 5 minutes, then rinsed and dried at room temperature. The state of the remaining stain of the dried test cloth is compared with a standard photograph plate so that the soil releasability is expressed by the corresponding determined grade (cf. Table 1). The standard photograph plate is one according to AATCC-TM130-2000 (American Association of Textile Chemists and Colorists, Test Method 130-2000)

TABLE 1

| Determined grade of soil releasability | |
|---|---|
| Determined grade | Criteria |
| 1.0 | Stain remarkably remains |
| 2.0 | Stain considerably remains |
| 3.0 | Stain slightly remains |
| 4.0 | Stain is not noticeable |
| 5.0 | Stain does not remain |

The oil repellency test is conducted by using a textile according to AATCC-TM118-2000. The test cloth is spread horizontally and a test liquid shown in Table 2 is dropped on the test cloth. The penetration state is determined after 30 seconds. When the oil repellency is low, an oily soil is penetrated into the treated article so that the removal of the soil is difficult. Thus, the oil repellency is an important indication in the same position as the soil releasability (SR property).

TABLE 2

| Oil repellency | Test liquid | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| 0 | Inferior to 1 | — |

The handling test is conducted by using a textile. The hand feeling of the test cloth is determined in the following determination standard.

Good: Same feeling as an untreated cloth:
Fair: Slightly harder feeling than an untreated cloth
Bad: Apparently harder feeling than an untreated cloth Reference Test Various combinations of polymerizable monomers are used to determine the compatibility of polymerizable monomers and the homogeneity of a polymerization liquid in a given solvent for the purpose of supporting that the use of a polymerizable monomer having a short chain Rf group improves the compatibility with a fluorine-free polymerizable monomer to minimize the use amount of an organic solvent which is a polymerization solvent.

The compatibility of the polymerizable monomers is evaluated as follows:

Good: homogeneous
Fair: Dispersed
Bad: Separated

The post-polymerization state (that is, the state after polymerization) is evaluated as follows:

Good: Homogeneous liquid state is maintained
Bad: Homogeneous liquid state is not maintained The results confirmed that the use of specified polymerizable monomers having the Rf group having less than 8 carbon atoms improves the compatibility with the fluorine-free polymerizable monomer to realize the homogeneous polymerization under the low amount of the organic solvent which is the polymerization solvent.

Synthetic Example 1

A monomer (hereinafter referred to as "13FA") (10 g) of the formula:

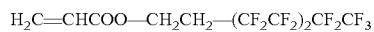

$$H_2C=CHCOO-CH_2CH_2-(CF_2CF_2)_2CF_2CF_3$$

and each of monomers (hereinafter referred to as "MPOEMA") (10 g) of the formula:

$$H_2C=C(CH_3)COO-(CH_2CH_2O)_n-CH_3$$

wherein n is 4, 8 or 12 were mixed. The compatibility at 25° C. was observed. Further, isopropanol (20 g) was added to each of mixtures (20 g), charged into a four-necked flask and heated at 75° C. Oxygen in the system was sufficiently substituted with nitrogen, and then azobisisobutyronitrile (0.05 g) was added twice at an interval of one hour to conduct the polymerization. The state of the liquid was observed. In addition, the same polymerization was repeated with changing isopropanol to acetone and conducting the polymerization in an autoclave, and then the state of the liquid was observed. The results are shown in Table 3.

Synthetic Example 2

The same procedure as in Synthetic Example 1 was repeated except that the monomer 13FA used in Synthetic Example 1 was replaced by a monomer (hereinafter referred to as "αCL-13FA") of the formula:

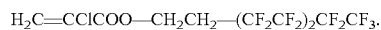

$$H_2C=CClCOO-CH_2CH_2-(CF_2CF_2)_2CF_2CF_3.$$

The results are shown in Table 3.

Synthetic Example 3

The same procedure as in Synthetic Example 1 was repeated except that the monomer MPOEMA used in Synthetic Example 1 was replaced by a monomer (hereinafter referred to as "POPMA") of the formula:

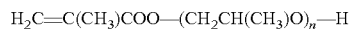

$$H_2C=C(CH_3)COO-(CH_2CH(CH_3)O)_n-H$$

(n=5, 9 or 13).

The results are shown in Table 4.

Synthetic Example 4

The same procedure as in Synthetic Example 3 was repeated except that the monomer 13FA used in Synthetic Example 3 was replaced by the monomer αCL-13FA.

The results are shown in Table 4.

Comparative Synthetic Example 1

The same procedure as in Synthetic Example 1 was repeated except that the monomer 13FA was replaced by a monomer (hereinafter referred to as "17FA") of the formula:

$$H_2C=CHCOO-CH_2CH_2-(CF_2CF_2)_3CF_2CF_3.$$

The results are shown in Table 3.

Comparative Synthetic Example 2

The same procedure as in Synthetic Example 1 was repeated except that the monomer 13FA was replaced by the monomer 17FA and the monomer MPOEMA was replaced by the monomer POPMA.

The results are shown in Table 4.

TABLE 3

| | Result 1 of Synthetic Examples | | | |
|---|---|---|---|---|
| Example No. | Number of n in $(CH_2CH_2O)_n$ in MPOEMA | Compatibility with FA | Post-polymerization state in IPA | Post-polymerization state in acetone |
| Synthetic Example 1 (Monomer13FA) | 4 | Good | Good | Good |
| | 8 | Good | Good | Good |
| | 12 | Good | Good | Good |

TABLE 3-continued

Result 1 of Synthetic Examples

| Example No. | Number of n in $(CH_2CH_2O)_n$ in MPOEMA | Compatibility with FA | Post-polymerization state in IPA | Post-polymerization state in acetone |
|---|---|---|---|---|
| Synthetic Example 2 (αCL-13FA) | 4 | Good | Good | Good |
|  | 8 | Good | Good | Good |
|  | 12 | Good | Good | Good |
| Comparative Synthetic Example 1 (17FA) | 4 | Bad | Bad, Gelation | Bad, Gelation |
|  | 8 | Bad | Bad, Gelation | Bad, Gelation |
|  | 12 | Bad | Bad, Gelation | Bad, Gelation |

Compatibility with FA:
  Good: homogeneous
  Fair: Dispersed
  Bad: Separated
Post-Polymerization State:
  Good: Homogeneous liquid state is maintained
  Bad: Homogeneous liquid state is not maintained
13FA:

$$H_2C=CHCOO-CH_2CH_2-(CF_2CF_2)_2CF_2CF_3$$

αCL-13FA:

$$H_2C=CClCOO-CH_2CH_2-(CF_2CF_2)_2CF_2CF_3$$

17FA:

$$H_2C=CHCOO-CH_2CH_2-(CF_2CF_2)_3CF_2CF_3$$

MPOEMA:

$$H_2C=C(CH_3)COO-(CH_2CH_2O)_n-CH_3$$

FA: General term of 13FA, αCL-13FA and 17FA
IPA: Isopropanol

TABLE 4

Result 2 of Synthetic Examples

| Example No. | Number of n in $(CH_2CH(CH_3)O)_n$ in POPMA | Compatibility with FA | Post-polymerization state in IPA | Post-polymerization state in acetone |
|---|---|---|---|---|
| Synthetic Example 3 (13FA) | 5 | Good | Good | Good |
|  | 9 | Good | Good | Good |
|  | 13 | Good | Good | Good |
| Synthetic Example 4 (αCL-13FA) | 5 | Good | Good | Good |
|  | 9 | Good | Good | Good |
|  | 13 | Good | Good | Good |
| Comparative Synthetic Example 2 (17FA) | 5 | Bad | Bad, Gelation | Bad, Gelation |
|  | 9 | Bad | Bad, Gelation | Bad, Gelation |
|  | 13 | Bad | Bad, Gelation | Bad, Gelation |

Compatibility with FA:
  Good: homogeneous
  Fair: Dispersed
  Bad: Separated
Post-Polymerization State:
  Good: Homogeneous liquid state is maintained
  Bad: Homogeneous liquid state is not maintained
13FA:

$$H_2C=CHCOO-CH_2CH_2-(CF_2CF_2)_2CF_2CF_3$$

αCL-13FA:

$$H_2C=CClCOO-CH_2CH_2-(CF_2CF_2)_2CF_2CF_3$$

17FA:

$$H_2C=CHCOO-CH_2CH_2-(CF_2CF_2)_3CF_2CF_3$$

POPMA:

$$H_2C=C(CH_3)COO-(CH_2CH(CH_3)O)_n-H$$

FA: General term of 13FA, αCL-13FA and 17FA
IPA: Isopropanol

Example 1

A monomer (hereinafter referred to as "13FA") (10 g) of the formula:

$$H_2C=CHCOO-CH_2CH_2-(CF_2CF_2)_2CF_2CF_3.$$

a monomer (hereinafter referred to as "PE200") (10 g) of the formula:

$$H_2C=C(CH_3)COO-(CH_2CH_2O)_{4.5}-H$$

wherein the average number of oxyethylene group is 4.5, and isopropyl alcohol (20 g) were charged into a four-necked flask. Oxygen in the system was sufficiently substituted with nitrogen, and then azobisisobutyronitrile (0.05 g) was added twice at an interval of one hour to conduct the polymerization. A gel permeation chromatography of the resultant polymerization liquid as such for measuring the molecular weight confirmed that peaks derived from the monomers disappeared and that peaks derived from the copolymer were formed.

Example 2

The same polymerization and analysis as in Example 1 were repeated except that the monomer 13FA used in Example 1 was replaced by a monomer (hereinafter referred to as "αCL-13FA") of the formula:

$$H_2C=CClCOO-CH_2CH_2-(CF_2CF_2)_2CF_2CF_3.$$

Example 3

The same polymerization and analysis as in Example 1 were repeated except that the monomer 13FA used in Example 1 was replaced by a monomer (hereinafter referred to as "13FMA") of the formula:

$H_2C=C(CH_3)COO-CH_2CH_2-(CF_2CF_2)_2CF_2CF_3$.

Example 4

The same polymerization and analysis as in Example 1 were repeated except that the monomer 13FA used in Example 1 was replaced by a monomer (hereinafter referred to as "αF-13FA") of the formula:

$H_2C=CFCOO-CH_2CH_2-(CF_2CF_2)_2CF_2CF_3$.

Example 5

The same polymerization and analysis as in Example 1 were repeated except that the monomer 13FA used in Example 1 was replaced by a monomer (hereinafter referred to as "13FCHMA") of the formula:

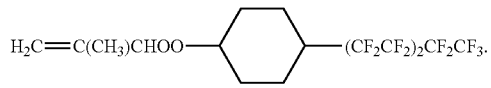

Example 6

The same polymerization and analysis as in Example 1 were repeated except that 6 g among 10 g of PE200 used in Example 1 was replaced by a monomer (hereinafter referred to as "PP800") of the formula:

$H_2C=C(CH_3)COO-(CH_2CH(CH_3)O)_{12}-H$.

Example 7

The same polymerization and analysis as in Example 1 were repeated except that 10 g of PE200 used in Example 1 was replaced by 4 g of PP800 and 6 g of a monomer (hereinafter referred to as "PME400") of the formula:

$H_2C=C(CH_3)COO-(CH_2CH_2O)_9-CH_3$.

Comparative Example 1

The same polymerization as in Example 1 was repeated except that 13FA was replaced with a monomer (hereinafter referred to as "17FA") of the formula:

$H_2C=CHCOO-CH_2CH_2-(CF_2CF_2)_3CF_2CF_3$.

Since a polymerization liquid was not recovered, the reaction was discontinued and the reaction mixture was discarded.

Comparative Example 2

The same polymerization and analysis as in Example 1 were repeated except that 13FA used in Example 1 was replaced by 17FA and the amount of isopropyl alcohol was increased to 40 g.

Comparative Example 3

The same polymerization and analysis as in Example 1 were repeated except that 10 g of 13FA used in Example 1 was replaced by 6 g of 17FA and 4 g of a monomer (hereinafter referred to as "21FA") of the formula:

$H_2C=CHCOO-CH_2CH_2-(CF_2CF_2)_4CF_2CF_3$ and the amount of isopropyl alcohol was increased to 60 g.

Comparative Example 4

The same polymerization and analysis as in Example 1 were repeated except that 13FA (10 g) used in Example 1 was replaced by 17FA (6 g) and the amount of PE200 was increased to 14 g.

Test Example 1

The polymerization liquid obtained in Example 1 was diluted to the concentration of 1% solid with water to give a treatment bath. A cotton twill cloth and a 65% polyester/35% cotton mixture twill cloth were immersed in this treatment bath and squeezed by rolls to give a wet pickup of 60 mass % and 55 mass %, respectively. The clothes were dried at 110° C. for 2 minutes and heat-treated at 160° C. for 1 minute to complete the treatment with the soil release agent. The soil releasability and the oil repellency of these clothes were measured. The results are shown in Table 5.

Test Examples 2 to 7 and Comparative Test Examples 2 to 4

The procedure for test as in Test Example 1 was repeated except that the polymerization liquid was changed to each of those obtained in Examples 2 to 7 and Comparative Examples 2 to 4.

TABLE 5

| | | | | Results of Test Examples | | | | | | |
|---|---|---|---|---|---|---|---|---|---|---|
| Example No. | Type of polymer | IPA amount based on polymer | Molecular weight (Mn) | Soil releasability | | Oil repellency | | Handling | |
| | | | | C | PET/C | C | PET/C | C | PET/C |
| Test Example 1 | 13FA/PE200 (50/50) | 1.0 time | 33000 | 3.0 | 5.0 | 4 | 6 | Good | Good |
| Test Example 2 | αCL-13FA/PE200 (50/50) | 1.0 time | 29000 | 3.0 | 5.0 | 4 | 6 | Good | Good |

TABLE 5-continued

Results of Test Examples

| Example No. | Type of polymer | IPA amount based on polymer | Molecular weight (Mn) | Soil releasability C | Soil releasability PET/C | Oil repellency C | Oil repellency PET/C | Handling C | Handling PET/C |
|---|---|---|---|---|---|---|---|---|---|
| Test Example 3 | 13FMA/PE200 (50/50) | 1.0 time | 30000 | 3.0 | 5.0 | 4 | 6 | Good | Good |
| Test Example 4 | αF-13FA/PE200 (50/50) | 1.0 time | 32000 | 3.0 | 5.0 | 4 | 6 | Good | Good |
| Test Example 5 | 13FCHMA/PE200 (50/50) | 1.0 time | 3000 | 3.0 | 5.0 | 4 | 6 | Good | Good |
| Test Example 6 | 13FA/PP800/PE200 (50/30/20) | 1.0 time | 28000 | 4.0 | 5.0 | 5 | 8 | Good | Good |
| Test Example 7 | 13FA/PP800/PME400 (50/20/30) | 1.0 time | 28000 | 4.0 | 5.0 | 5 | 7 | Good | Good |
| Com. Test Example 1 | 17FA/PE200 (50/50) | 1.0 time | Liquid state was not maintained after polymerization | | | | | | |
| Com. Test Example 2 | 17FA/PE200 (50/50) | 2.0 times | 18000 | 3.0 | 5.0 | 4 | 6 | Fair | Fair |
| Com. Test Example 3 | 17FA/21FA/PE200 (30/20/50) | 3.0 times | 22000 | 2.5 | 4.0 | 4 | 6 | Bad | Bad |
| Com. Test Example 4 | 17FA/PE200 (30/70) | 1.0 time | 20000 | 1.0 | 2.0 | 2 | 3 | Good | Good |

13FA:

αCL-13FA:

13FMA:

αF-13FA:

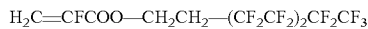

13FCHMA:

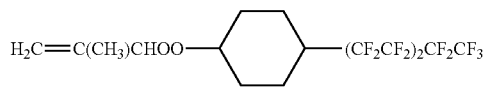

17FA:

21FA:

PE200:

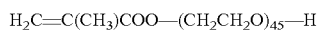

PP800:

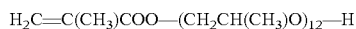

PME400:

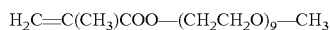

IPA: Isopropanol
C: Cotton twill cloth
PET/C: 65% polyester/35% cotton mixture twill cloth

The invention claimed is:

1. A copolymer comprising:
   (a) a fluorine-containing acrylate of the general formula (1):

wherein X is a fluorine atom, a chlorine atom, a bromine atom, an iodine atom, a $CFX^1X^2$ group (wherein $X^1$ and $X^2$ is a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;
   Y is an aliphatic group having 1 to 10 carbon atoms, an aromatic or cycloaliphatic group having 6 to 10 carbon atoms, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group); and
   Rf is a linear or branched polyfluoroalkyl group having less than 8 carbon atoms, and
   (b) a fluorine-free (meth)acrylate of the general formula (2):

wherein X is a hydrogen atom or a methyl group,
   R is an alkylene group having 2 to 6 carbon atoms, and
   n is an integer of 2 to 50, and
   wherein the fluorine-free (meth)acrylate of the general formula (2) is polymerized at the C=C position and the COO—(RO)$_n$—X in formula (2) exists as a side chain in the copolymer.

2. The copolymer according to claim 1, wherein the amount of the component (a) may be from 20 to 90% by weight, and the amount of the component (b) is from 10 to 80% by weight, based on the copolymer.

3. The copolymer according to claim 1, wherein the number-average molecular weight of the copolymer is from 1,000 to 1,000,000.

4. The copolymer according to claim 1, wherein the component (b) comprises the following combination of two components:
Component (b-1): a compound wherein R in the general formula (2) is ethylene, and
Component (b-2): a compound wherein R in the general formula (2) is propylene.

5. The copolymer according to claim 4, wherein the weight ratio of the component (b-1) to the component (b-2) is from 95:5 to 5:95.

6. A soil release agent comprising the copolymer according to claim 1.

7. The soil release agent according to claim 6, which further contains a liquid medium.

8. A method of treating a substrate, which comprises treating the substrate with the soil release agent according to claim 6.

9. The copolymer according to claim 1, wherein the copolymer exhibits a soil releasability of at least 4.0 as measured using the following method:
spreading a 7 cm×7 cm square test cloth on a piece of blotting paper, then dropping on the test cloth one drop of a soil comprising a dispersion of carbon black (0.1% by weight) in triolein;
positioning a polyethylene sheet on the test cloth and positioning a weight of 500 g on the polyethylene sheet;
removing the weight and the polyethylene sheet after 60 seconds;
allowing the test cloth to remain standing at a room temperature for 24 hours to adhere the soil to the test cloth;
charging the test cloth and a ballast cloth which together have a total weight of 500 g, and 12.5 g of SUPER COMPACT TOP cleaning agent into an electrical washer;
washing for 5 minutes the test cloth in a bath having a volume of 25 L and temperature of 40° C. for 5 minutes then rinsing and drying the test cloth at room temperature;
comparing a stain remaining on the dried test cloth to a standard photograph plate and expressing the soil releasability by a corresponding determined grade, wherein the standard photograph plate is one according to AATCC-TM130-2000.

\* \* \* \* \*